United States Patent [19]

De Blasis

[11] Patent Number: 5,337,706
[45] Date of Patent: Aug. 16, 1994

[54] HIGH-PERFORMANCE INTERNAL-COMBUSTION ENGINE, PARTICULARLY OF THE FOUR-STROKE TYPE

[76] Inventor: Ruben E. De Blasis, Calle 509 nr. 1425 - esquina 9 bis, 1901 Ringuelet, Ciudad de la Plata (Prov. of Buenos Aires), Argentina

[21] Appl. No.: 148,700

[22] Filed: Nov. 5, 1993

[30] Foreign Application Priority Data

Nov. 16, 1992 [IT] Italy .................. MI92 A 002613

[51] Int. Cl.⁵ .......................... F02M 35/10
[52] U.S. Cl. .......................... 123/52.3; 123/547
[58] Field of Search .............. 123/52 MB, 52 M, 547

[56] References Cited

U.S. PATENT DOCUMENTS

| | | |
|---|---|---|
| 1,896,401 | 2/1933 | Godward . |
| 4,413,605 | 11/1983 | Leoni .................. 123/547 |
| 4,414,932 | 11/1983 | Lindberg ............. 123/547 |
| 4,817,566 | 4/1989 | Neuman .............. 123/547 |
| 5,056,474 | 10/1991 | Tezuka et al. ...... 123/52 MB |
| 5,063,899 | 11/1991 | Hitomi et al. ...... 123/52 MB |
| 5,133,308 | 7/1992 | Hitomi et al. ...... 123/52 MB |

FOREIGN PATENT DOCUMENTS 3308174 9/1984 Fed. Rep. of Germany .
3818099 12/1988 Fed. Rep. of Germany .
8203424 10/1982 PCT Int'l Appl. .

Primary Examiner—David A. Okonsky
Attorney, Agent, or Firm—Renner, Kenner, Greive, Bobak, Taylor & Weber

[57] ABSTRACT

High-performance internal-combustion engine, particularly of the four-stroke type, including an engine block inside which combustion chambers are formed; each chamber slidingly accommodates a piston and is connected to at least one inlet duct for the air-fuel mixture and to at least one discharge duct for the burnt gases produced by combustion; these ducts are connected to the respective combustion chamber through valves. The internal-combustion engine has the particularity of including a converting-compensating device constituted by at least one pre-chamber mutually connecting at least two inlet ducts and at least one thermal contact chamber which is connected to at least one of the inlet ducts proximate to their outlet leading into the associated combustion chamber. This chamber is formed at the engine head and is in thermal contact with the associated combustion chamber.

4 Claims, 2 Drawing Sheets

HIGH-PERFORMANCE INTERNAL-COMBUSTION ENGINE, PARTICULARLY OF THE FOUR-STROKE TYPE

BACKGROUND OF THE INVENTION

The present invention relates to a high-performance internal-combustion engine, particularly of the four-stroke type.

As is known, in internal-combustion engines combustion is produced by the ignition of the air-fuel mixture by means of the spark produced by the spark plugs. In order to obtain good combustion and a significant reduction in the volume of the exhaust gases and unburnt gases, the modern technology used in high-performance engines relies on the use of sophisticated electronic equipment, such as for example centralized units for controlling ignition and adjusting the flow of fuel into the combustion chamber, in order to achieve optimum filling of the cylinders.

The flow of fuel into the combustion chamber is generally adjusted by means of injection systems which can be divided into three main types: fuel injection with a mechanical method, electronic injection, and finally mechanical injection with electronic adjustment.

In mechanical injection devices, the fuel is injected into the induction manifold with the same method used for injecting Diesel fuel in Diesel-cycle engines. The injector is a passive valve that opens spontaneously when the fuel reaches it with a pressure higher than the value for which its spring is set. Accordingly, the feed circuit includes an electric pump which feeds the fuel at an adequate pressure and sends it to a distribution unit that distributes it simultaneously to all the injectors in an amount proportionate to the mass of air entering the cylinders. In this type of injection device, injection occurs continuously, with no reference to the position of the system. A mechanical injection system of the type described above is, for example, the device commercially known by the name K-Jetronic of the Bosch company, and is composed exclusively of metering units, regulators and metering units of a mechanical type. In particular, there is a rocker diaphragm that weighs the amount of air flowing through the manifold.

Differently from mechanical injection devices, electronic injection devices, such as for example the devices commercially known by the names IWA by the Magneti Marelli company or L-Jetronic by the Bosch company, have no moving mechanical parts, although at the base of the circuit there is an electric pump that feeds the fuel at lower pressures than those of mechanical-injection devices. The heart of the electronic system is constituted by the injector, which is no longer a passive valve but an active valve. In other words, it determines the moment of injection, the duration and the amount of fuel injected, by virtue of the fact that it is controlled electronically. The two electric wires powering it are in fact controlled by a control unit to which the various sensors for measuring air flow-rate, rpm rate, throttle position and engine temperature are connected. The injection can be a single one in the manifold (single-point injection) or on each inlet valve (multi-point injection), and can take into account the position of the piston. In this last case, the injection is also termed sequential or timed.

Mechanical injection devices with electronic adjustment, such as for example the device commercially known by the name KE-Jetronic by the Bosch company, are devices in which injection is mechanical but fuel metering and idling conditions are controlled by an electronic control unit connected to sensors.

Although they have helped to improve the performance of internal-combustion engines, the above described injection devices have shown some limitations in terms of cylinder filling and in terms of disproportion in the charge in the cylinders; overcoming these limitations would lead to an even better thermodynamic efficiency of internal-combustion engines.

SUMMARY OF THE INVENTION

A principal aim of the present invention is to provide an internal-combustion engine which allows to achieve better filling and a proportional charge in the cylinders, eliminating vibrations substantially completely and consequently obtaining higher power and acceleration.

Another aim of the invention is to provide an internal-combustion engine which, by improving combustion, allows to save fuel and drastically reduce polluting emissions.

With these and other aims, which will become apparent hereinafter, in view, there is provided, according to the present invention, a high-performance internal-combustion engine, particularly of the four-stroke type, comprising an engine block inside which combustion chambers are formed, each one of said chambers slidingly accommodating a piston and being connected to at least one inlet duct for the air-fuel mixture and to at least one discharge duct for the burnt gases produced by combustion, said ducts being connected to the respective combustion chamber through valve means, characterized in that it comprises a converting-compensating device comprising at least one pre-chamber which mutually connects at least two inlet ducts and at least one thermal contact chamber connected to at least one of said inlet ducts proximate to their outlet leading into the associated combustion chamber, said chamber being formed at the engine head and being in thermal contact with the associated combustion chamber.

BRIEF DESCRIPTION OF THE DRAWINGS

Further characteristics and advantages of the engine according to the present invention will become apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
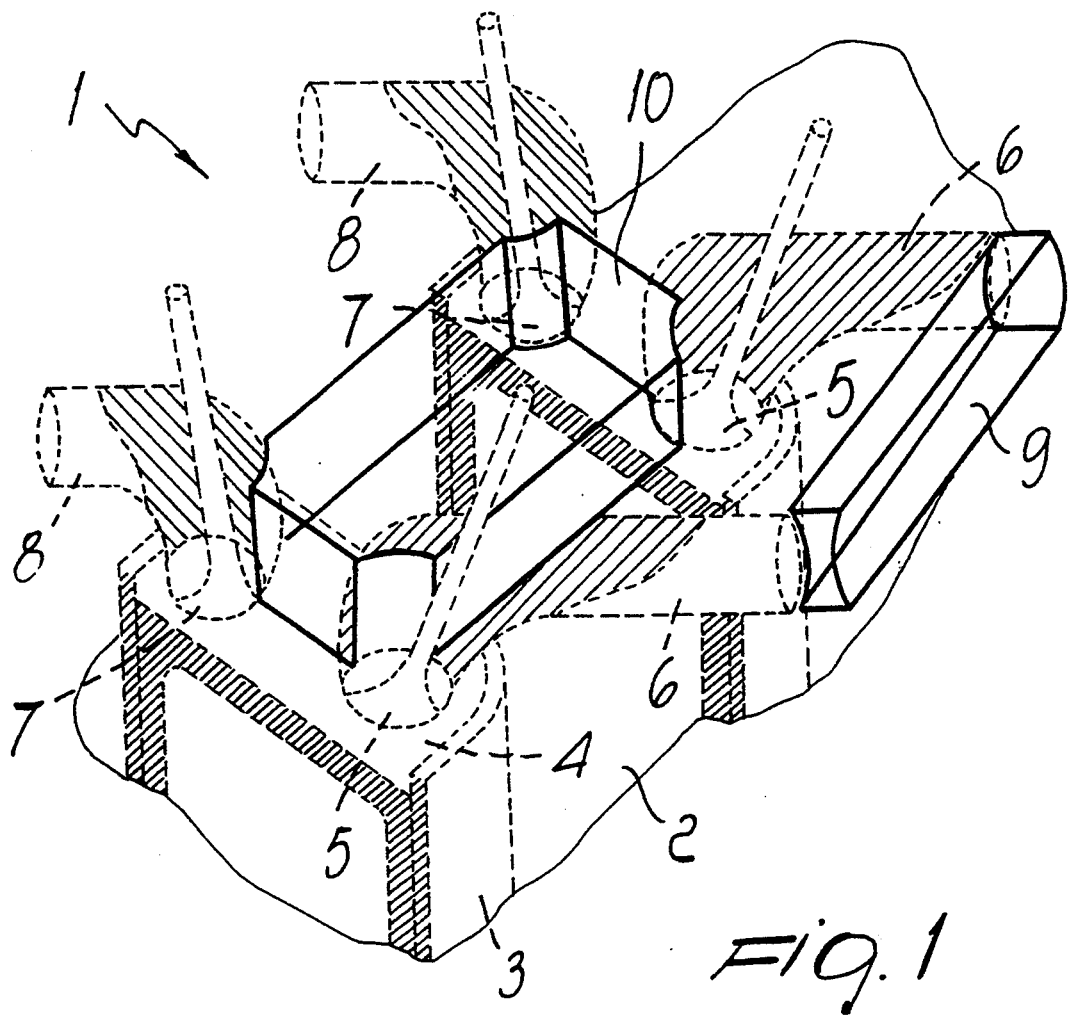
FIG. 1 is a partially cutout schematic perspective view of an engine according to the present invention proximate to its head, with said head shown in phantom lines for the sake of clarity.

With reference to the above figures, the engine according to the invention, generally designated by the reference numeral 1, comprises, in a per se known manner, an engine block 2 inside which the cylinders 3 are located, forming the combustion chambers 4. Each combustion chamber is connected, through a valve 5, to at least one inlet duct 6 for the air-fuel mixture and, through at least one valve 7, to at least one exhaust duct 8 for the burnt gases produced by combustion.

Differently from known engines, the engine according to the present invention comprises a converting-compensating device constituted by at least one pre-chamber 9 mutually connecting at least two of the inlet ducts 6 and by at least one thermal contact chamber 10 which is connected to at least one of the inlet ducts 6 proximate to their outlet leading into the associated combustion chamber 4. The chamber 10 is formed at the engine head and is placed in thermal contact with the associated combustion chamber.

Figure 2:
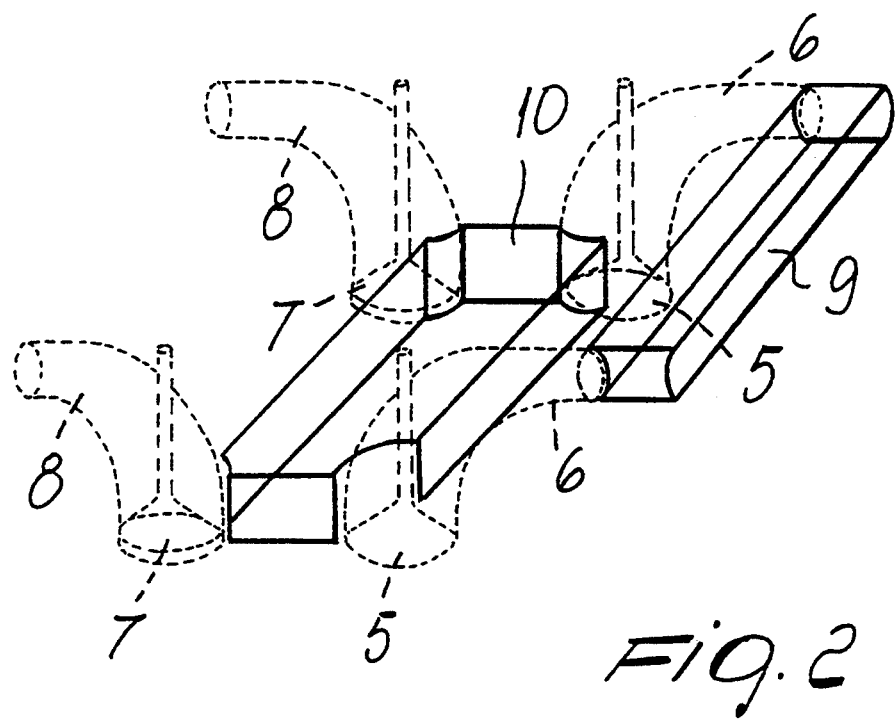
FIG. 2 is a schematic perspective view, taken similarly to FIG. 1, in which the engine is seen from a different angle and the cylinders are omitted for the sake of clarity.
Figure 3:
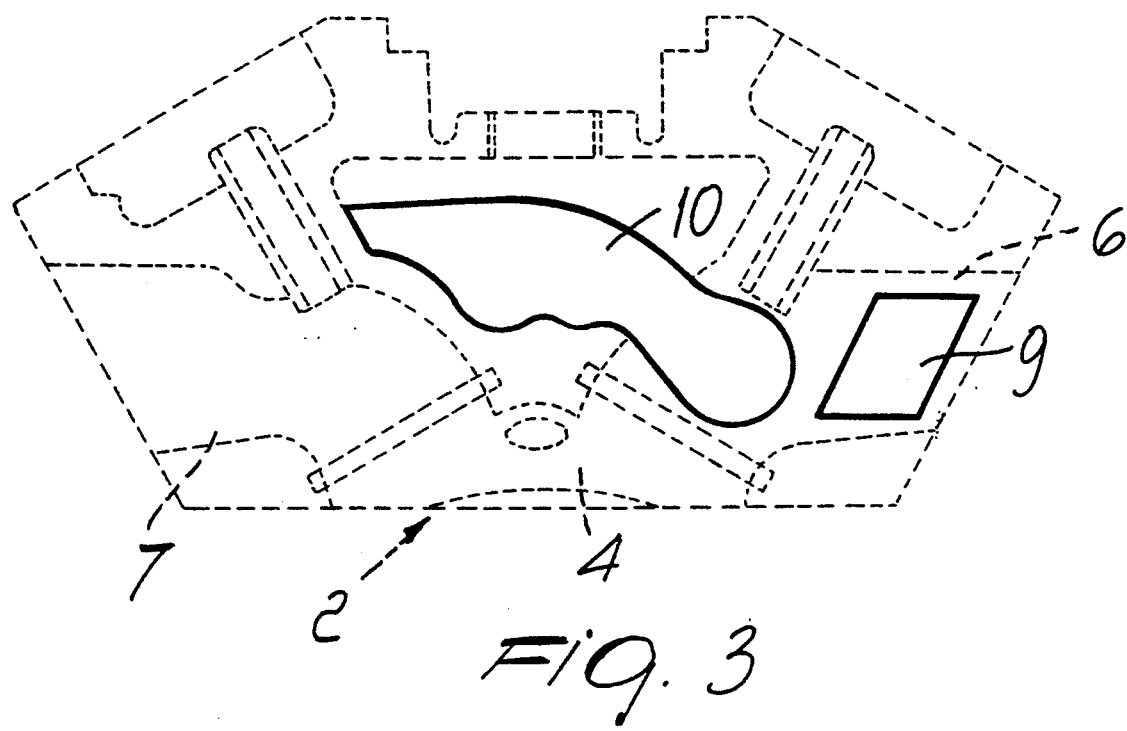
FIG. 3 is a schematic front sectional elevation view of the engine head, taken along a front plane.
Figure 4:
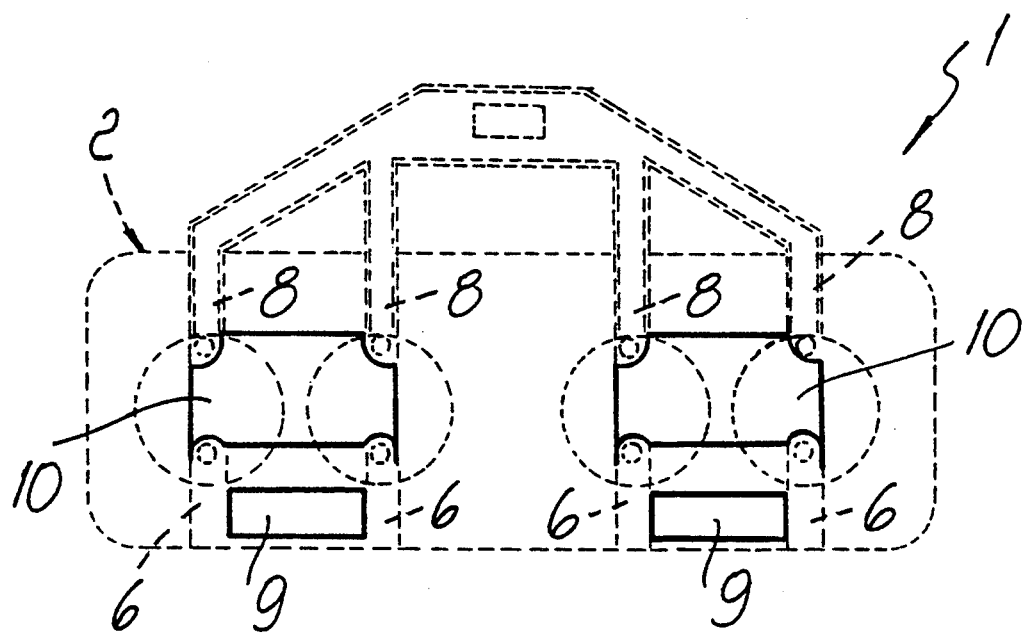
FIG. 4 is a schematic plan view of the engine head proximate to its base.

The thermal contact chamber 10 has been illustrated schematically in FIGS. 1, 2 and 4 with a substantially parallelepiped-like shape, but it may have various shapes to adapt to the shapes of the engine head in which it must be placed; for example, it may have a complex shape, such as for example the one shown in FIG. 3, so as to adapt to the head walls which delimit the combustion chambers 4 in an upward region. In particular, the shape of the chamber 10 is studied so as to obtain excellent heat exchange between the chamber 10 and the combustion chamber or chambers 4 without negatively affecting, in practice, the mechanical strength of the engine head.

Advantageously, the chamber 10 is in thermal contact both with the underlying combustion chamber or chambers 4 and with the walls of the exhaust duct or ducts 8.

Furthermore, as can be seen in the various figures, the chamber 10 is connected to the inlet duct or ducts 6 proximate to the outlet of said ducts which leads into the associated combustion chamber 4.

Experimental tests have allowed to observe that the engine with the converting-compensating device according to the invention achieves better filling of the cylinders with a proportional charge in the various cylinders which allows to substantially entirely eliminate engine vibrations during running. In these conditions, power and acceleration are higher than in conventional engines.

The engine according to the invention allows to achieve a fuel saving of 15 to 25%, reducing the amount of oxygen used and consequently, due to the better combustion thus obtained, drastically reduce polluting emissions.

The many and real advantages arising from the present invention can be assessed by analyzing the operation of the engine according to the invention in greater detail.

Thermodynamics experiments and calculations in fact demonstrate that maximum power, efficiency in terms of energy, and the use of smaller amounts of fuel than conventional engines are due to optimum cylinder filling.

In conventional four-stroke engines, during the filling cycle, a mixture composed of air and fuel is fed into the cylinders; these components are present in the following amounts: one part of $C_7H_{16}$ and 15 to 20 parts—77% N and 23% O—of air. The maximum amount of mixture fed is directly proportional to the movement of the piston and is inversely proportional to the amount of residual gases present in the combustion chamber. Inflow into the cylinders of fresh mixture, which obviously absorbs heat, produced by the previous combustion cycle, leads to a stabilization of the temperature around a value which varies between 150° and 200° C.

This temperature is due to the surface which transmits heat and to the stability of the 15° C. of the temperature of the air fed into the cylinders.

Engine power is directly proportional to the degrees of temperature of the mixture; indeed, the higher this temperature, the lower the density of the mixture and accordingly the smaller the charge in the cylinders. With the engine according to the invention, during the initial step of the feed period the mixture passes from the liquid state to a pre-gaseous state in the pre-chamber 9 which connects the inlet ducts 6, where its temperature is a function of the rpm rate of the engine. After this first transformation step, the mixture passes from the pre-gaseous state to the permanent gaseous state in the chamber 10 located above the combustion chamber 4. The permanent gaseous state of the mixture is directly proportional to the temperature of the chamber 10, of the combustion chamber 4 and of the temperature in the exhaust ducts 8.

The temperature is the result of an equation involving the following factors: engine rpm rate, compression ratio, fuel quality. The result is a thermal variation ranging from a minimum value of 700° C. to a maximum value of 2300° C.

It is evident that the molecular structure of the mixture ($C_7H_{16}$+77% N 23% O) changes according to the above mentioned temperature, thus giving rise to new molecular chains which produce a specific motion and temperature (much higher than that produced by conventional engines), producing new energy. The converting-compensating device in these conditions self-adjusts automatically according to the rpm rate of the engine. It can be said, on the basis of the known data, that the perfect volume forms automatically during the induction stroke.

The operation of the converting-compensating device is ensured by the partial vacuum caused by the movement of the piston during the feeding of the mixture from the chamber 10 into the combustion chamber 4; throughout the duration of this step there are no knocking effects, defects such as drops in temperature and power losses, as instead can be often observed in conventional engines.

It can thus be stated that the lower pressure occurring during combustion is inversely proportional to the temperature and power values.

The dynamic phase observed in the cylinders involves only the gases (never the mixture); these gases enter the cylinders at a higher speed (than in conventional engines), requiring a lower amount of fuel, and the result of this thermodynamic action is an increase in temperature, producing perfect combustion.

In practice it has been observed that the engine according to the invention fully achieves the intended aim, since it allows to achieve higher power, lower consumption, greater quietness, lack of vibrations, reduction in the volumetric quantity of burnt gases and higher acceleration.

The engine thus conceived is susceptible to numerous modifications and variations, all of which are within the scope of the inventive concept; all the details may furthermore be replaced with other technically equivalent elements.

In practice, the materials employed, as well as the dimensions, may be any according to the requirements and the state of the art.

I claim:

1. High-performance internal-combustion engine, particularly of the four-stroke type, comprising an engine block inside which combustion chambers are formed, each one of said chambers slidingly accommodating a piston and being connected to at least one inlet duct for air-fuel mixture and to at least one discharge duct for the burnt gases produced by combustion, said ducts being connected to the respective combustion chamber through valve means, the engine further comprising a converting-compensating assembly comprising at least one communication passage mutually connecting and allowing the mixture to transfer between at least two inlet ducts and at least one thermal contact chamber into which the mixture may flow, said one thermal contact chamber being connected to at least one of said inlet ducts proximate to their outlet leading into the associated combustion chamber, said thermal contact chamber being formed at the engine head and being in thermal contact with the associated combustion chamber.

2. Engine according to claim 1, wherein said at least one thermal contact chamber is in thermal contact with at least one of said discharge ducts.

3. Engine according to claim 1, wherein said thermal contact chamber is connected to the associated inlet duct proximate to its outlet, adjusted by the valve means, leading into said combustion chamber.

4. Engine according to claim 1, wherein said thermal contact chamber is formed inside the engine head.

* * * * *